United States Patent
Wang

(10) Patent No.: US 9,672,402 B2
(45) Date of Patent: Jun. 6, 2017

(54) FINGERPRINT INDENTIFICATION APPARATUS AND MANUFACTUREING METHEOD THEREOF

(71) Applicant: MiiCs & Partners Inc., Road Town (VG)

(72) Inventor: Juan Wang, Shenzhen (CN)

(73) Assignee: MiiCs & Partners Inc., Road Town (VG)

( * ) Notice: Subject to any disclaimer, the term of this patent is extended or adjusted under 35 U.S.C. 154(b) by 162 days.

(21) Appl. No.: 14/555,718

(22) Filed: Nov. 28, 2014

(65) Prior Publication Data

US 2016/0148032 A1    May 26, 2016

(30) Foreign Application Priority Data

Nov. 24, 2014    (CN) .......................... 2014 1 0678986

(51) Int. Cl.
*G06K 9/00*    (2006.01)
(52) U.S. Cl.
CPC ................................ *G06K 9/0002* (2013.01)
(58) Field of Classification Search
CPC ............. G06K 9/0002; G06K 9/00053; G06K 9/00013; H04H 21/4415
See application file for complete search history.

(56) References Cited

U.S. PATENT DOCUMENTS

| 7,009,410 | B2 |  | 3/2006 | Ito et al. | |
|---|---|---|---|---|---|
| 7,738,681 | B1 | * | 6/2010 | Rannow | G06K 9/0002 382/124 |
| 7,817,821 | B2 | * | 10/2010 | Milne | G06K 9/6293 382/100 |
| 8,031,916 | B2 | * | 10/2011 | Abiko | G06K 9/00053 283/68 |
| 8,378,508 | B2 | * | 2/2013 | Bond | G06K 9/0002 257/688 |
| 8,569,875 | B2 | * | 10/2013 | Bond | G06K 9/0002 257/688 |
| 8,570,303 | B2 | * | 10/2013 | Chen | G06K 9/0004 345/175 |
| 2014/0352440 | A1 |  | 12/2014 | Fennell et al. | |

FOREIGN PATENT DOCUMENTS

TW    555959    10/2013

\* cited by examiner

*Primary Examiner* — Yosef Kassa
(74) *Attorney, Agent, or Firm* — Zhigang Ma

(57) ABSTRACT

A fingerprint identification apparatus includes a fingerprint identification module and a signal transmitting module electrically connected to the fingerprint identification module. The signal transmitting module includes a loading substrate and a first sensing layer with a plurality of first sensing units. The first sensing units are located on the loading substrate in a matrix. Each corner of the first sensing units is a substantially arc shaped.

6 Claims, 14 Drawing Sheets

FINGERPRINT INDENTIFICATION APPARATUS AND MANUFACTUREING METHEOD THEREOF

CROSS-REFERENCE TO RELATED APPLICATIONS

This application claims priority to Chinese Patent Application No. 201410678986.8 filed on Nov. 24, 2014, the contents of which are incorporated by reference herein.

FIELD

The present disclosure relates to a fingerprint identification apparatus.

BACKGROUND

Fingerprint identification apparatuses set in a portable electronic device are used for protecting personal privacy information for improving security function, and include a plurality of sensing units. The sensing unit emits sensing signals and forms a fingerprint based on signals feedback by a finger. The sensing units are separately manufactured.

BRIEF DESCRIPTION OF THE FIGURES

Implementations of the present technology will now be described, by way of example only, with reference to the attached figures.

DETAILED DESCRIPTION

Figure 1:
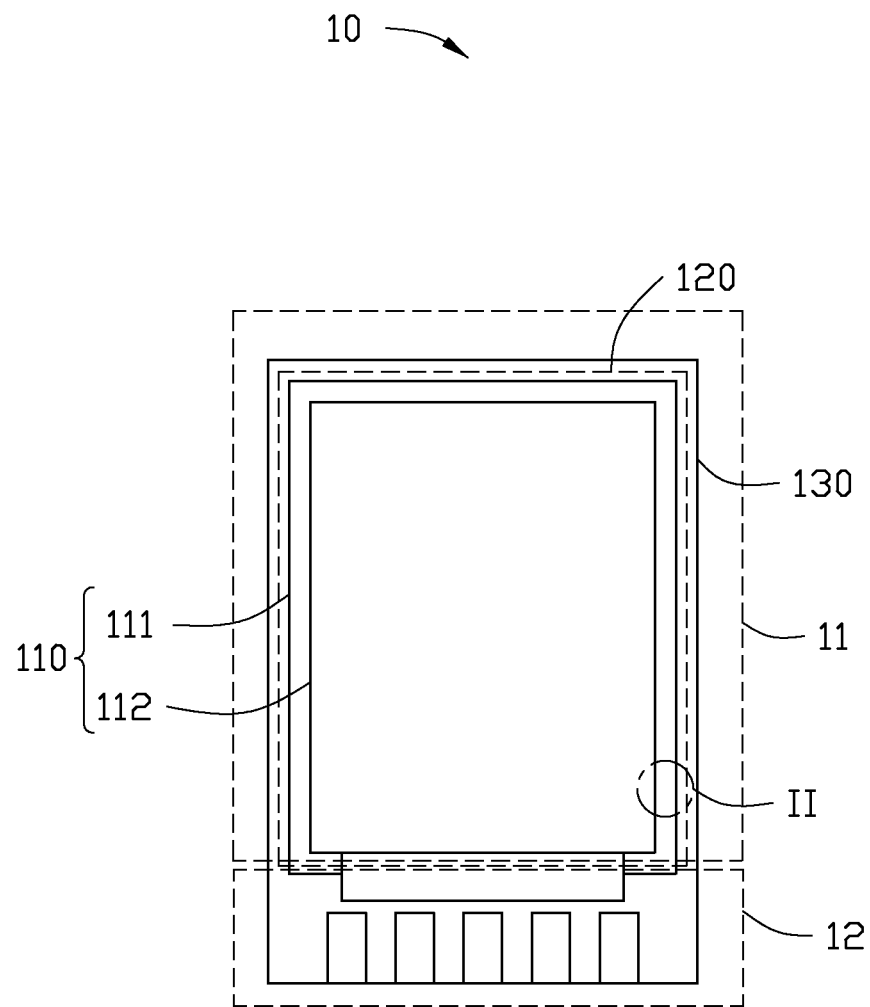
FIG. 1 is a plane view of an embodiment of a fingerprint identification apparatus, the fingerprint identification apparatus comprising a signal receiving layer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates a fingerprint identification apparatus 10 of the embodiment. The fingerprint identification apparatus 10 includes a fingerprint identification module 11 and a signal transmitting module 12. The signal transmitting module 12 is electrically connected to the fingerprint identification module 11 via a plurality of conductive connecting pad (not shown).

The fingerprint identification module 11 identifies an object contacted with the fingerprint identification module 11 and generates an image information. The fingerprint identification module 11 includes a first sensing layer 110, a second sensing layer 120, and a loading substrate 130 sandwiched between the first sensing layer 110 and the second sensing layer 120. The second sensing layer 120 continuously generates ultrasonic signals to the object via transmitting through the loading substrate 130 and the first sensing layer 120 orderly. The first sensing layer 110 receives feedback signals reflected by the object and transfers the feedback signals into electrical signals. The loading substrate 130 includes a plurality of thin film transistors (TFTs, not shown) for electrically connecting to the first sensing layer 110 and the second sensing layer 120. In at least one embodiment, the first sensing layer 110 is made of polyvinylidene fluoride (PVDF).

Further, the first sensing layer 110 includes a signal receiving layer 111 and a first electrode layer 112. The signal receiving layer 111 receives feedback signals reflected by the object and transfers the feedback signals into electrical signals. The first electrode layer 112 transmits the electrical signals to the TFTs of the loading substrate 130. The second sensing layer 120 includes a second electrode layer (not shown) for providing electrical signals and a signal generating layer (not shown) for generating the ultrasonic signals to the first sensing layer 110 based on the electrical signals generated by the second electrode layer.

When the object is located on the first sensing layer 110, the signal receiving layer 111 transfers the feedback signals into corresponding electrical signals based on a energy difference between the reflected ultrasonic signal and the generated ultrasonic signal, and transmits to the TFTs of the loading substrate 130.

In other embodiments, the first sensing layer 110 further includes two first electrode 112.

Figure 2:
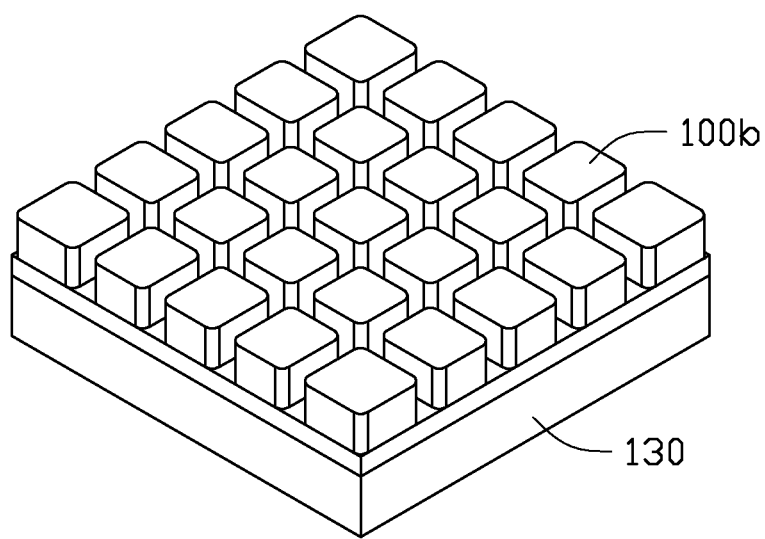
FIG. 2 is an enlarged cross-sectional view of an embodiment of the signal receiving layer of FIG. 1, taken along a line II thereof, the signal receiving layer comprising a plurality of first sensing units.

FIG. 2 illustrates the first sensing layer 110 includes a plurality of first sensing units 100b arranged in a matrix. The first sensing units 100b are pasted on the loading substrate 130 via a first adhesive layer (not shown).

Figure 3:
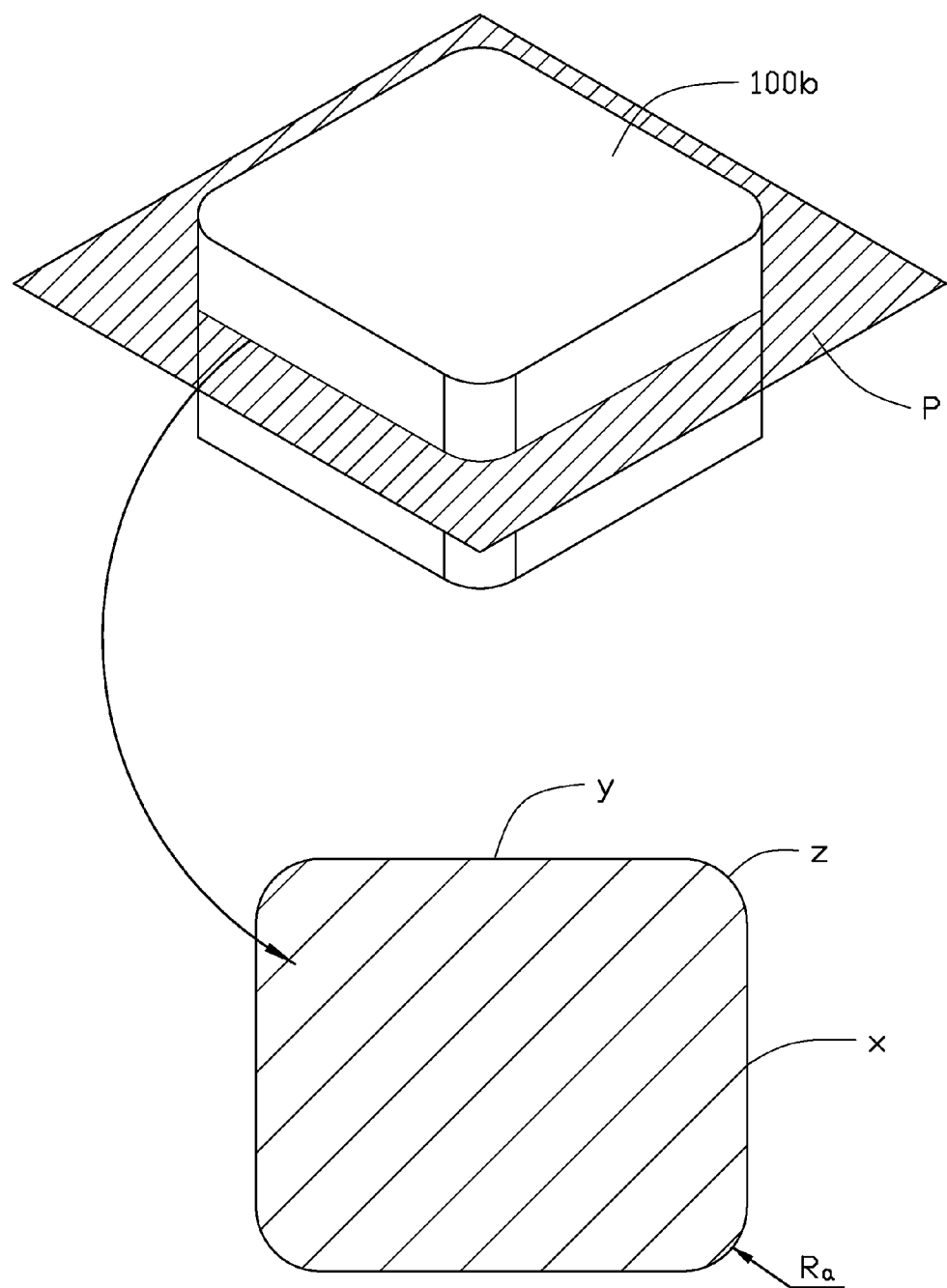
FIG. 3 is an enlarged isometric view of an embodiment of the first sensing unit of FIG. 2.

FIG. 3 illustrates the first sensing unit 100b includes arc corners and is a substantially cubic shaped. A cross section of the first sensing unit 100b taken along a plane P parallel with the loading substrate 130 includes two first side edges x parallel with each other, two second side edges y parallel with each other, and four connecting portion z. A connecting portion z is used for connecting the first edge x and the adjacent second edge y. The connecting portion z is a substantially arc shaped. A curvature radius of the connecting portion z is greater than 0.1 millimeter (mm). In at least one embodiment, the first sensing unit 100b is a substantially cuboid shaped.

Figure 4:
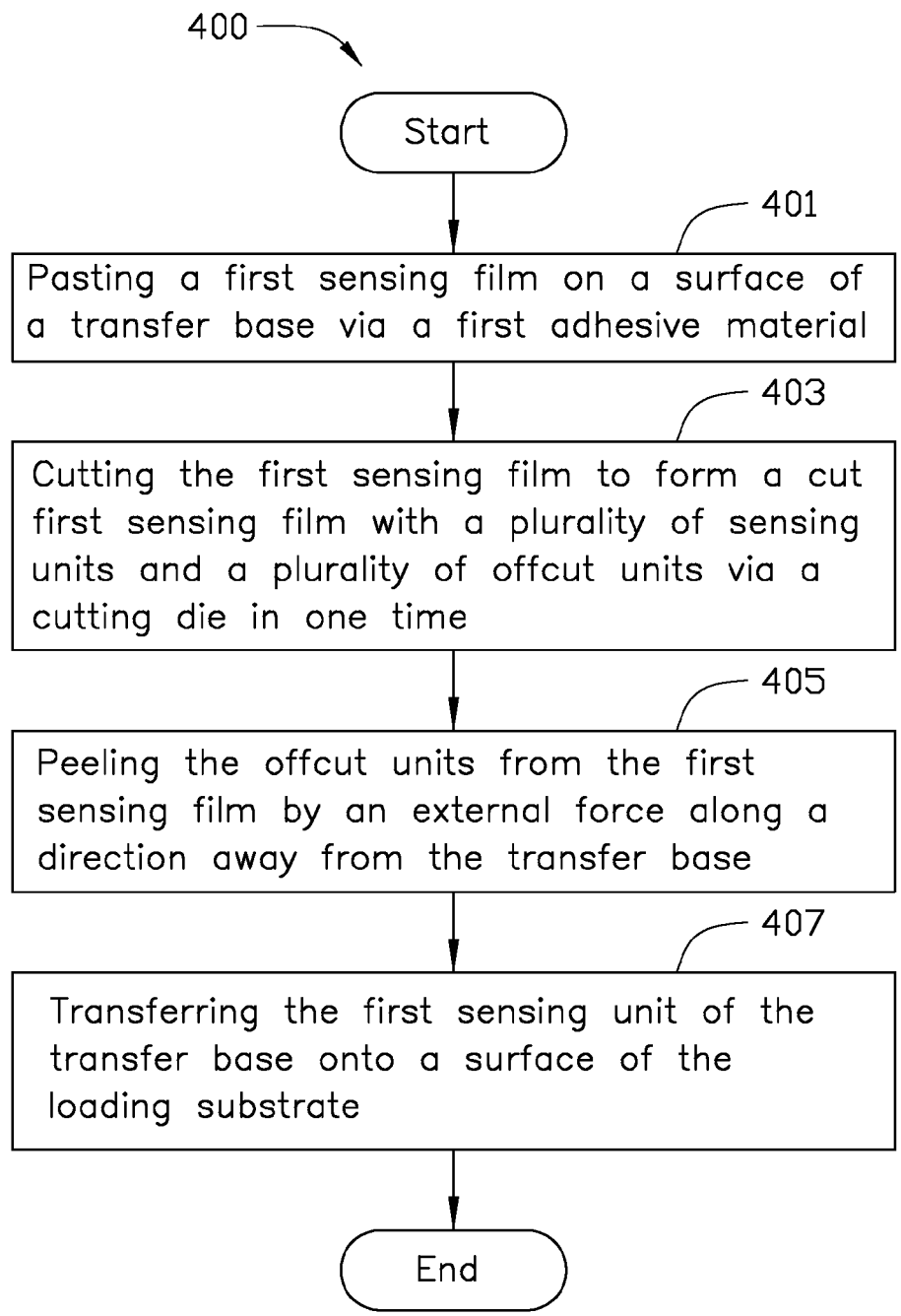
FIG. 4 is a flowchart of an embodiment of a manufacturing method for manufacturing the signal receiving layer of FIG. 1.

FIG. 4 is a flowchart is presented in accordance with an example embodiment. The method 400 is provided by way of example, as there are a variety of ways to carry out the method. The method 400 described below can be carried out using the configurations illustrated in FIG. 1, for example, and various elements of these figures are referenced in explaining the method 400. Each block shown in FIG. 4 represents one or more processes, methods or subroutines, carried out in the method 400. Furthermore, the order of blocks is illustrative only and the order of the blocks can change according to the present disclosure. Additional blocks can be added or blocks can be removed, without departing from this disclosure. The method 400 can begin at block 401.

Figure 5:
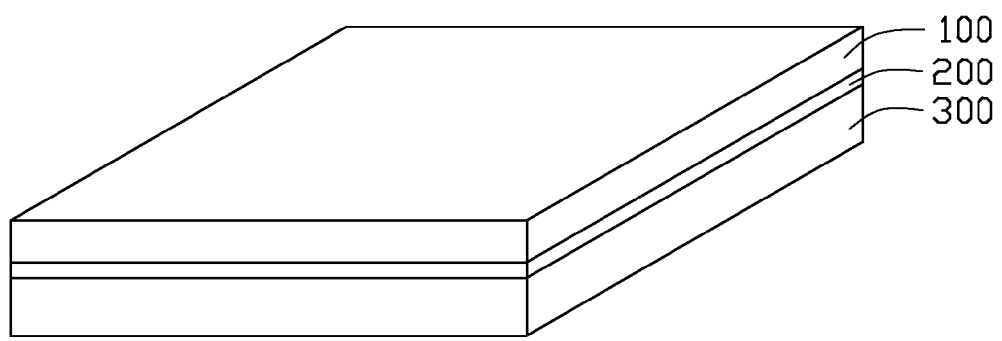
FIGS. 5-6 and 9-14 are respectively isometric views of an embodiment of the signal receiving layer in different blocks of the manufacturing process of FIG. 4.

At block 401, pasting a first sensing film 100 on a surface of a transfer base 300 (as shown in FIG. 5). The first sensing film 100 is pasted on the transfer base 300 via a first adhesive material 200. In at least one embodiment, the first sensing film 100 is made one of glass, stainless steel, or polyethylene terephthalate (PET) material.

Figure 6:
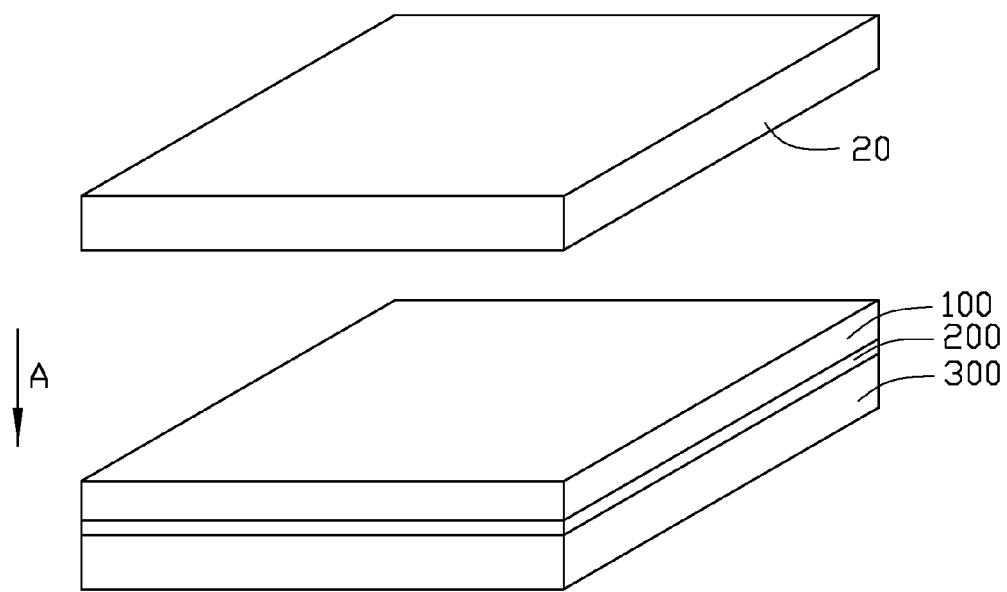
Figure 9:
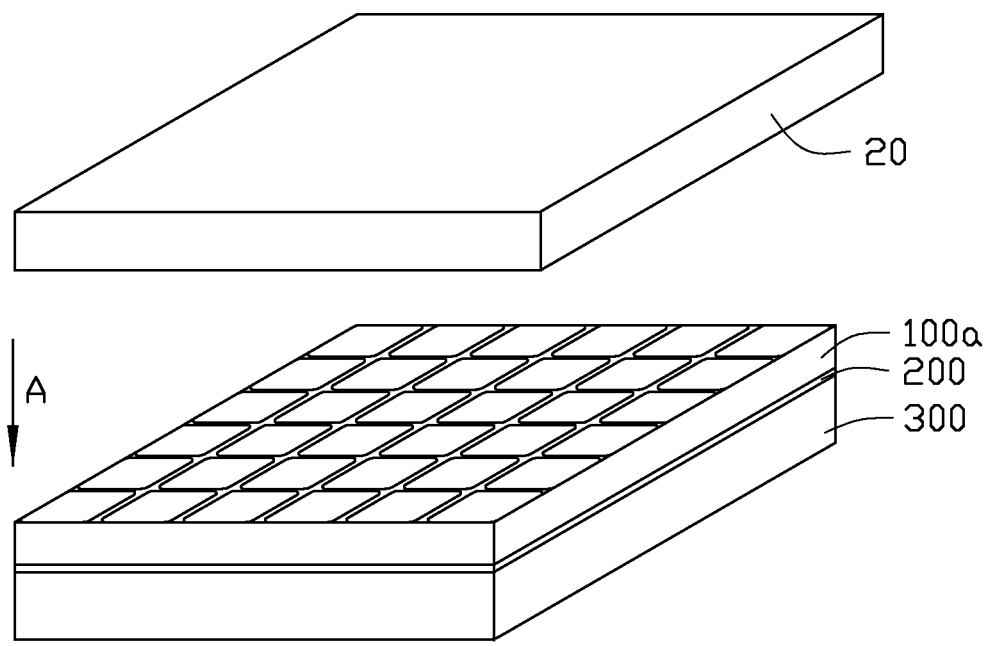

At block 403, cutting the first sensing film 100 to form a cut first sensing film 100a with the formed plurality of sensing units 100b and a plurality of offcut units 100c via a cutting die 20 in one time. The cutting die 20 aligns with the first sensing film 100 pasted on the transfer base 300, and cuts the first sensing film 100 based on a pressure along a first direction A (as shown in FIG. 6). The first direction A is perpendicular to the first sensing film 100. The cutting die 20 further moves away from the cut first sensing film 100 along a direction opposite to the first direction A (as shown in FIG. 9).

Figure 11:
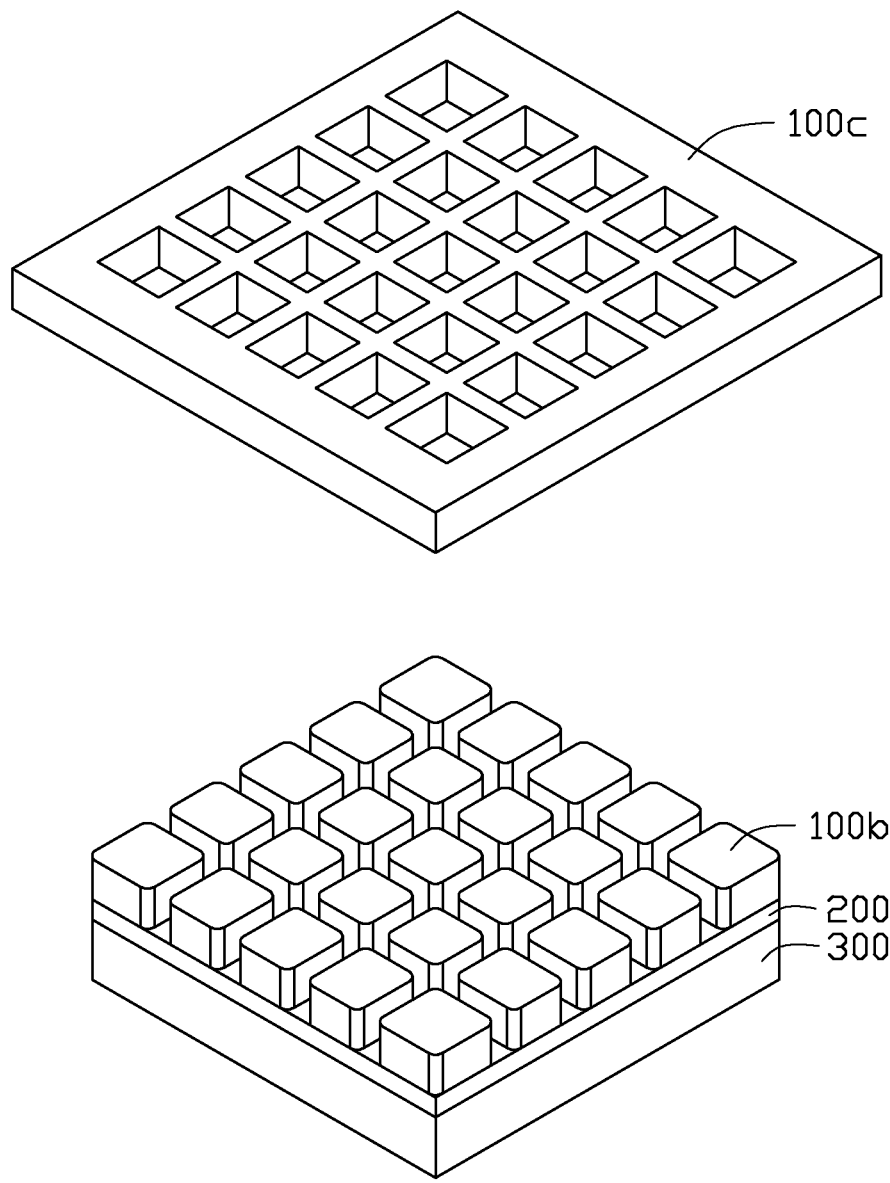
Figure 12:
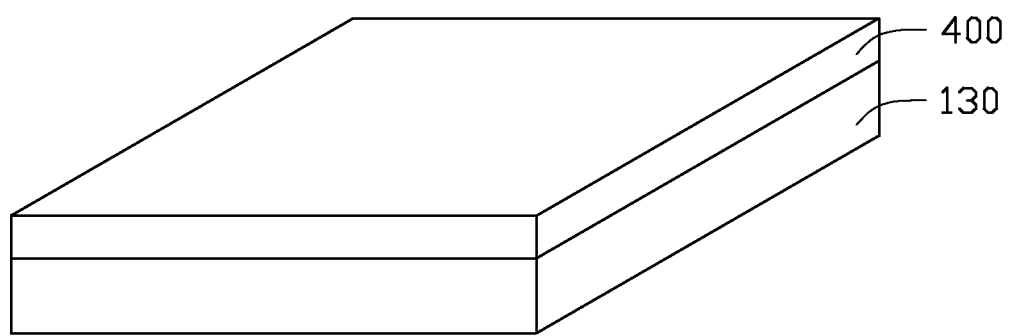
Figure 13:
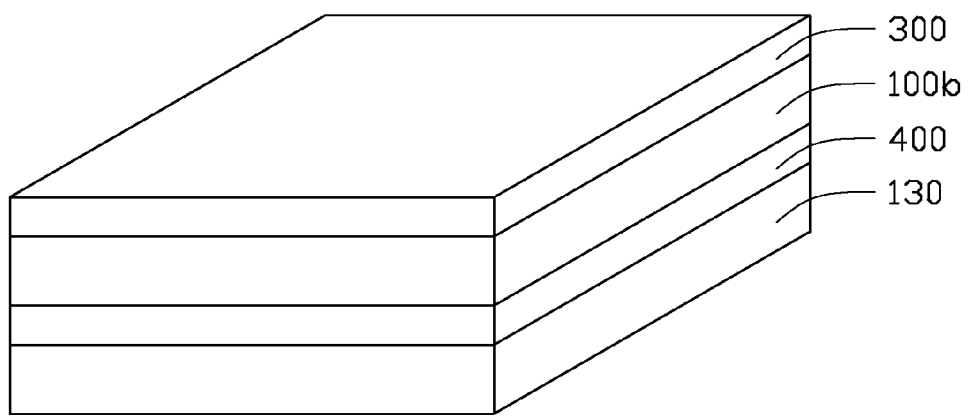
Figure 14:
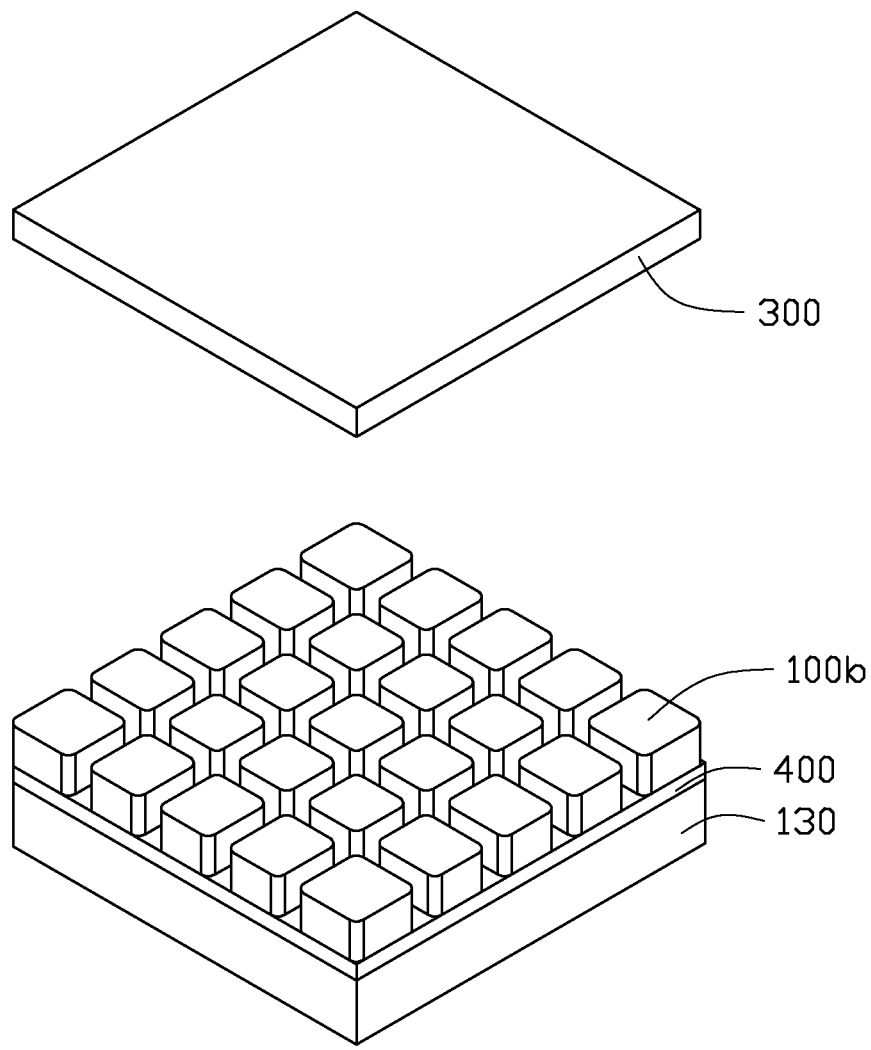

At block 405, peeling the offcut units 100c from the first sensing film 100a by an external force along a direction away from the transfer base 300 (as shown in FIGS. 3 and 11). Stresses on the connecting portion z of the first sensing unit 100b are evenly dispersed, which cause the first sensing unit 100b to be maintained pasting on the transfer base 300 while peeling the offcut units 100c from the first sensing film 100a. The first sensing unit 100b are arranged in a matrix after peeling the offcut units 100c from the first sensing film 100a.

At block 407, transferring the first sensing unit 100b of the transfer base 300 onto a surface of the loading substrate 130 via a second adhesive material 400 (as shown in FIGS. 3 and 12-14). The second adhesive material 400 is pasted on a surface of the first loading substrate 130. In at least one embodiment, the loading substrate 130 is made one of glass, stainless steel, or PET material. The transfer base 300 with the first sensing unit 100b aligns with the loading substrate 130, and the first sensing unit 100b is pasted on the second adhesive material 400. The transfer base 300 is peeled from the first sensing unit 100b via an external force along a direction away from the loading substrate 130. A stickiness of the second adhesive material 400 is greater than a stickiness of the first adhesive material 200, which cause the first sensing unit 100b to be maintained pasting on the loading substrate 130.

Figure 7:
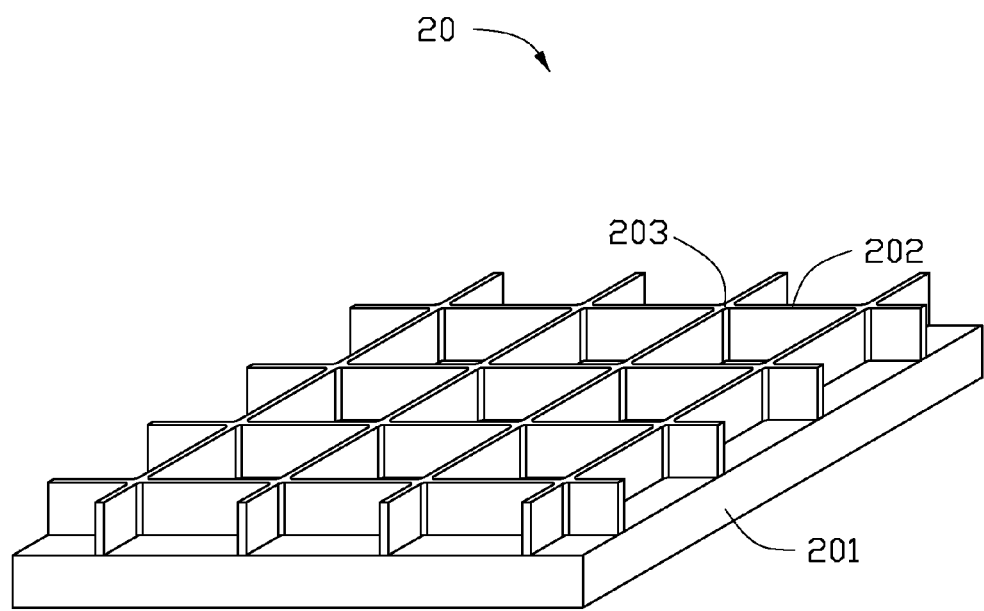
FIG. 7 is an isometric view of an embodiment of a cutting die, the cutting die comprising a plurality of cutting units.

FIG. 7 illustrates the cutting die 20 includes a base 201 and a plurality of cutting units 202 perpendicularly extended from the base 201. The cutting units 202 are arranged in a matrix to form a plurality of vacancy regions 203 corresponding to the offcut units 100c in a one-to-one relationship.

Figure 8:
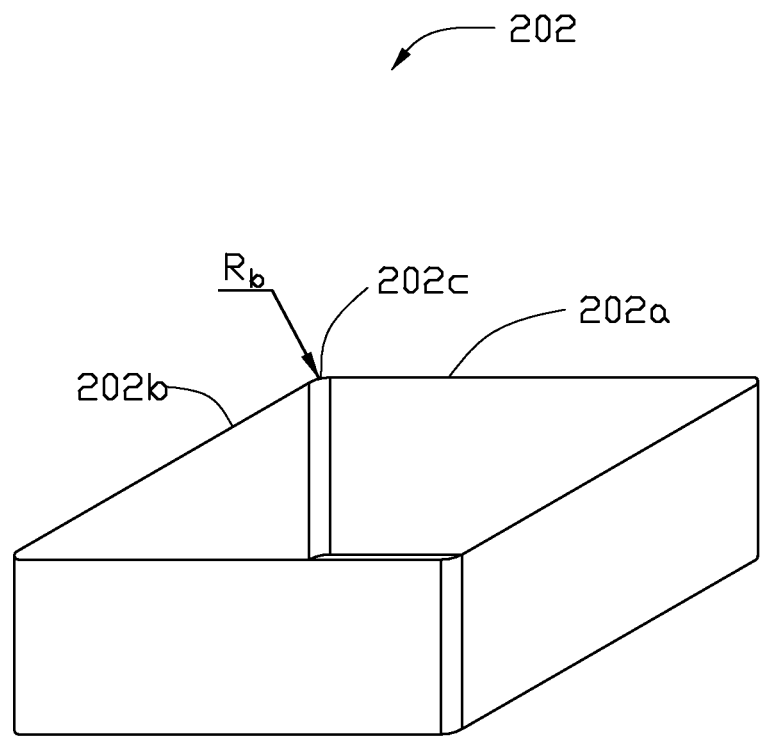
FIG. 8 is an enlarged isometric view of an embodiment of the cutting unit of FIG. 7.
Figure 10:
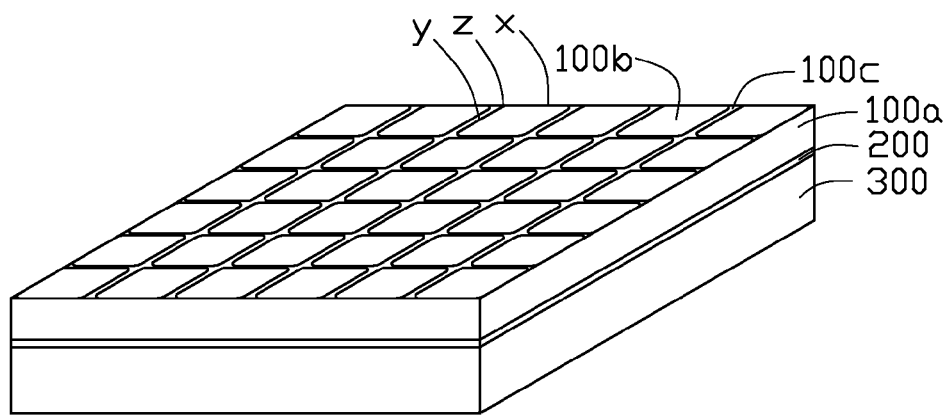

FIG. 8 illustrates the cutting unit 202 includes two first blades 202a parallel with each other, two second blades 202b parallel with each other, and four arc blades 202c. The arc blade 202c is used for connecting the first blade 202a and the adjacent second blade 202b. A curvature radius of the arc blade 202c is greater than 0.1 mm. A height of the arc blade 202c is greater than a thickness of the first sensing film 100 for improving an accuracy of the manufacturing and preventing a damage of the loading substrate 130. In at least one embodiment, a thickness of the first sensing film 100 is greater than 0.001 mm. The first blade 202a, the second blade 202b, and the arc blade 202c are made of stainless steel. The first blade 202a corresponds to the first side edge x, the second blade 202b corresponds to the second side edge y, and the arc blade 202c corresponds to the connecting portion z (as shown in FIG. 10). In other embodiments, the first blade 202a, the second blade 202b, and the arc blade 202c are made of different materials for forming different sharp degrees and different intensity.

In other embodiments, the signal receiving layer 111 and the first electrode layer 112 are overlapped and being cut by the cutting die 20 simultaneously. The signal receiving layer 111 and the first electrode layer 112 are flexible.

Based on the cutting die 20 with the cutting units 202, the first sensing units 100b are simultaneously formed in a matrix on the transfer base 300, and being transferred onto the loading substrate 130 for improving manufacturing process. The transfer base 300 is capable of recycling.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A fingerprint identification apparatus comprising:
a fingerprint identification module; and
a signal transmitting module electrically connected to the fingerprint identification module, the signal transmitting module comprising:
a loading substrate; and
a first sensing layer with a plurality of first sensing units;
wherein the first sensing units are located on the loading substrate in a matrix, each corner of the first sensing units is a substantially arc shaped and each first sensing unit is substantially cubic shaped.

2. The fingerprint identification apparatus of claim 1, wherein a cross section of the first sensing unit taken along a plane parallel with the loading substrate comprises two first side edges parallel with each other and two second side edges parallel with each other; the connecting portion connects the first side edge and the adjacent second side edge.

3. The fingerprint identification apparatus of claim 2, wherein the connecting portion is a substantially arc shaped.

4. The fingerprint identification apparatus of claim 3, wherein a curvature radius of the connecting portion is greater than 0.1 millimeter.

5. The fingerprint identification apparatus of claim 1, wherein the first sensing unit is an ultrasonic sensing element.

6. The fingerprint identification apparatus of claim 1, further comprising a second sensing layer; wherein the loading substrate is sandwiched between the first sensing layer and the second layer.

* * * * *